United States Patent
Katzer et al.

(10) Patent No.: US 8,627,223 B1
(45) Date of Patent: Jan. 7, 2014

(54) CUSTOMIZED EXECUTION SEQUENCES FOR PORTIONS OF THIRD PARTY APPLICATIONS

(75) Inventors: Robin Dale Katzer, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1226 days.

(21) Appl. No.: 12/495,157

(22) Filed: Jun. 30, 2009

(51) Int. Cl.
*G06F 3/048* (2013.01)

(52) U.S. Cl.
USPC .......................................................... 715/765

(58) Field of Classification Search
USPC ................................................. 715/804, 765
See application file for complete search history.

(56) References Cited

U.S. PATENT DOCUMENTS

| | | | | |
|---|---|---|---|---|
| 6,104,393 | A * | 8/2000 | Santos-Gomez ............. | 715/763 |
| 6,564,375 | B1 * | 5/2003 | Jiang .............................. | 717/165 |
| 6,788,077 | B2 * | 9/2004 | Hamdan ........................ | 324/726 |
| 6,918,090 | B2 * | 7/2005 | Hesmer et al. ................ | 715/760 |
| 6,973,624 | B2 * | 12/2005 | Miksovsky et al. ........... | 715/762 |
| 7,093,198 | B1 * | 8/2006 | Paatero et al. ................ | 715/746 |
| 7,426,703 | B2 * | 9/2008 | Cheung et al. ................ | 715/854 |
| 7,546,543 | B2 * | 6/2009 | Louch et al. .................. | 715/762 |
| 7,793,215 | B2 * | 9/2010 | Cohen ........................... | 715/249 |
| 7,987,428 | B2 * | 7/2011 | Handy et al. .................. | 715/762 |
| 8,266,632 | B2 * | 9/2012 | Armangil ....................... | 719/313 |
| 8,341,593 | B2 * | 12/2012 | Fildebrandt et al. .......... | 717/105 |
| 8,370,750 | B2 * | 2/2013 | Adachi et al. ................ | 715/738 |
| 8,443,003 | B2 * | 5/2013 | O'Donnell et al. ........... | 707/795 |
| 2003/0043199 | A1 * | 3/2003 | Cooper et al. ................ | 345/804 |
| 2003/0081002 | A1 * | 5/2003 | De Vorchik et al. .......... | 345/762 |
| 2003/0126558 | A1 * | 7/2003 | Griffin ........................... | 715/513 |
| 2003/0160829 | A1 * | 8/2003 | Miksovsky et al. ........... | 345/804 |
| 2004/0068554 | A1 * | 4/2004 | Bales et al. ................... | 709/218 |
| 2006/0026527 | A1 * | 2/2006 | Bells ............................. | 715/747 |
| 2006/0101442 | A1 * | 5/2006 | Baumgart et al. ............. | 717/162 |
| 2007/0038940 | A1 * | 2/2007 | Benson et al. ................ | 715/744 |
| 2007/0101291 | A1 * | 5/2007 | Forstall et al. ................ | 715/805 |
| 2008/0115046 | A1 * | 5/2008 | Yamaguchi .................... | 715/201 |
| 2009/0099919 | A1 * | 4/2009 | Schultheiss et al. ............ | 705/14 |
| 2009/0138509 | A1 * | 5/2009 | Hind et al. ................. | 707/104.1 |
| 2009/0313582 | A1 * | 12/2009 | Rupsingh et al. ............. | 715/835 |
| 2009/0313601 | A1 * | 12/2009 | Baird et al. ................... | 717/106 |
| 2010/0325532 | A1 * | 12/2010 | Cohen ........................... | 715/234 |
| 2011/0078599 | A1 * | 3/2011 | Guertler et al. ............... | 715/765 |
| 2011/0154231 | A1 * | 6/2011 | Cherdron et al. ............. | 715/764 |
| 2013/0198645 | A1 * | 8/2013 | Bhandarkar et al. .......... | 715/741 |

* cited by examiner

*Primary Examiner* — Omar Abdul-Ali
*Assistant Examiner* — Phoebe Pan (57) ABSTRACT

A system is provided for customized execution sequences for portions of third party applications. A customizing tool conducts discovery through application program interfaces to identify data associated with screens associated with third party applications. Each application program interface is associated with a corresponding third party application. The customizing tool also enables selection of a customized screen execution sequence based on the data and a portion of the screens. The customized screen execution sequence includes at least one screen corresponding to each third party application and excludes at least one default start screen associated with at least one of the third party applications. Additionally, the customizing tool stores the selection of the customized screen execution sequence as a customized application. Execution of the customized application outputs a customized result to a user interface. The customized result is based on execution of the customized screen execution sequence.

18 Claims, 5 Drawing Sheets

CUSTOMIZED EXECUTION SEQUENCES FOR PORTIONS OF THIRD PARTY APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A mobile device may execute third party applications to provide benefits to a mobile device user. For example, the mobile device may execute an application that identifies restaurants within the vicinity of a location specified by the user. In another example, the mobile device may execute another application that enables the purchase of tickets for a movie at a theater specified by the user.

SUMMARY

In some embodiments, a system is provided for customized execution sequences for portions of third party applications. The system includes a processor and a customizing tool. When executed by the processor, the customizing tool conducts discovery through application program interfaces to identify data associated with screens associated with third party applications. Each of the application program interfaces is associated with a corresponding third party application. The customizing tool also enables selection of a customized screen execution sequence based on the data and a portion of the screens. The customized screen execution sequence includes at least one screen corresponding to each of the third party applications and excludes at least one default start screen associated with at least one of the third party applications. Additionally, the customizing tool stores the selection of the customized screen execution sequence as a customized application. Execution of the customized application outputs a customized result to a user interface. The customized result is based on execution of the customized screen execution sequence.

In some embodiments, a computer implemented method is provided for customized execution sequences for portions of third party applications. Application program interfaces are discovered to identify data associated with screens associated with third party applications. Each application program interface is associated with a corresponding third party application. Selection of a customized screen execution sequence is enabled based on the data and a portion of the screens. The customized screen execution sequence includes at least one screen corresponding to each third party application and excludes at least one default start screen associated with at least one third party application. The selection of the customized screen execution sequence is stored as a customized application. Execution of the customized application outputs a customized result to a user interface. The customized result is based on execution of the customized screen execution sequence.

In some embodiments, a system is provided for customized execution sequences for portions of third party applications. The system includes a processor and a customizing tool. When executed by the processor, the customizing tool executes a customized application based on executing a selected customized screen execution sequence. The selected customized screen execution sequence is based on data discovered via application program interfaces. Each application program interface is associated with a corresponding third party application. The customized screen execution sequence includes at least one screen corresponding to each third party application and excludes at least one default start screen associated with at least one third party application. The customizing tool outputs a customized result to a user interface. The customized result is based on execution of a customized screen execution sequence.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Although a mobile device may execute many different applications developed by third parties to benefit a mobile device user, the mobile device user may not be satisfied with the functioning of many third party applications. For example, a mobile device may execute a navigation application to determine which movie theaters are in the mobile device's vicinity and identify a nearby theater, but the user may cancel execution of the navigation application before the application provides directions to the identified movie theater. The user may instruct the mobile device to begin execution of a ticket purchase application to list which movies are playing at the identified theater, to identify when each movie is playing, and to purchase tickets for a movie that is showing at a specific time. After the user purchases the tickets via the ticket purchase application, the user may have to execute the navigation application again to be provided with directions to the movie theater. In addition to requiring the user to stop and start multiple applications to fulfill the user's requests, the applications may display many screens to the user that are not directly relevant to the user's current requests, which altogether may decrease customer satisfaction with the mobile device, the third party applications, and/or the mobile device communication provider.

Embodiments of the present disclosure provide systems and methods for customized execution sequences for portions of third party applications. A third party application developer may provide an application program interface that a client may invoke to identify data associated with a third party application's screens. For example, an application program interface for a navigation application enables a developer to identify data that includes the execution entry point, the entry data, the execution exit point, and the exit data for the screen that displays a list of restaurants or movie theaters at or nearby a specified location. The execution entry point may be the first of a series of instructions that may be executed to display a screen. The entry data may be the data that an application's instructions require to properly display a screen. For example, specification of a location may be required as entry data for a screen to display a list of movie theaters at or nearby the specified location. The execution exit point may be the last of the series of instructions that may be executed to display a screen. The exit data may be the data that an application's instructions retain and/or return after a screen is displayed. An application may use the exit data to determine the next screen to be generated, and may provide the exit data to the next screen. For example, a selection of a movie theater from a list of movie theaters may be the exit data for a first screen, the selection of the movie theater may determine that a second screen corresponding to the selected movie theater is the next screen to be generated, and the selection of the movie theater may be the entry data that enables the second screen to display the street address and telephone number for the selected movie theater.

A customizing tool may execute on a mobile device to create a customized application. A customized application is an application that combines the capabilities of independent applications in a manner that may be quicker and/or easier for a user to use than the use of the independent applications executed independently. A customized application may comprise portions of off-the-shelf applications which are combined in some new ways not provided by the original developers of the off-the-shelf applications. In some circumstances, a customized application may be built or composed by a user of the mobile device by using the customizing tool to provide an automated function of interest to that specific user or to provide an output in a format desired by that specific user. A customized application may be said in some contexts to produce a customized result. Alternatively, the customizing tool may execute on a computer to create a customized application that may be downloaded to a mobile device. The customizing tool may conduct discovery through application program interfaces to identify data associated with third party applications' screens. Discovery may be a procedure of determining an interface to an application through an interactive process involving queries and analysis of the responses to the queries. For example, the customizing tool uses application program interfaces to identify the execution entry points, the execution exit points, the entry data, and the exit data for the screens for a navigation application and a ticket purchase application.

The customizing tool enables a software developer, who may be a mobile device user, to select a customized screen execution sequence based on the data and a portion of the screens. For example, a mobile device user who is a software developer uses a computer to create the first half of a customized screen execution sequence based on the screens from a navigation application that enable identification and selection of movie theaters at or nearby a specified location. The developer may create the second half of the customized screen execution sequence based on screens from a ticket purchase application that enable the selection of movies and show times for a selected theater and the purchase of movie tickets for a selected movie and show time. The customized screen execution sequence may include at least one screen provided by each of the third party applications and excludes at least one default start screen associated with at least one of the third party applications. For example, execution of the customized screen execution sequence results in displaying some of the screens of the navigation application and the ticket purchase application, but bypasses displaying some of the screens of the navigation application and/or the ticket purchase application. In this example, the execution of the customized screen execution sequence bypasses displaying the ticket purchase application's default start screen, which requests a user to identify whether to purchase tickets for sporting events or for movie theaters.

The customizing tool may store the selection of the customized screen execution sequence as a customized application. If the customizing tool creates the customized application on the mobile device, then the customized application may be ready for execution. If the customizing tool creates the customized application on a computer, the computer may download the customized application to the mobile device. The customizing tool executes a customized application based on executing a customized screen execution sequence. For example, the customizing tool executes the customized application, which results in displaying a screen that prompts the mobile device user to specify a location. Using the location specified by the user as entry data, the customized application may display the navigation application screens that enable the user to view a list of movie theaters at or nearby the specified location and to select one of the movie theaters. Then the customized application may use the specified location as entry data to display the ticket purchase applications screen for the selected theater, which enables the user to select a movie and a show time and then to purchase tickets for the selected movie and show time. The customizing tool outputs a customized result to a user interface. For example, the customized result may confirm purchase of the selected tickets and offer the user the option to switch back to the navigation application to be provided with directions from the mobile device's current location to the movie theater.

Enabling the creation of customized execution sequences for portions of third party applications may result in increased usage of portions of the third party applications, which may result in increased advertising revenue for and/or increased customer satisfaction with the third party applications. Creation of such customized execution sequences may also result in increased mobile device usage, which may result in increased revenue for the mobile device communication service provider and in increased customer satisfaction for the mobile device manufacturer and the mobile device communication service provider.

Figure 1:
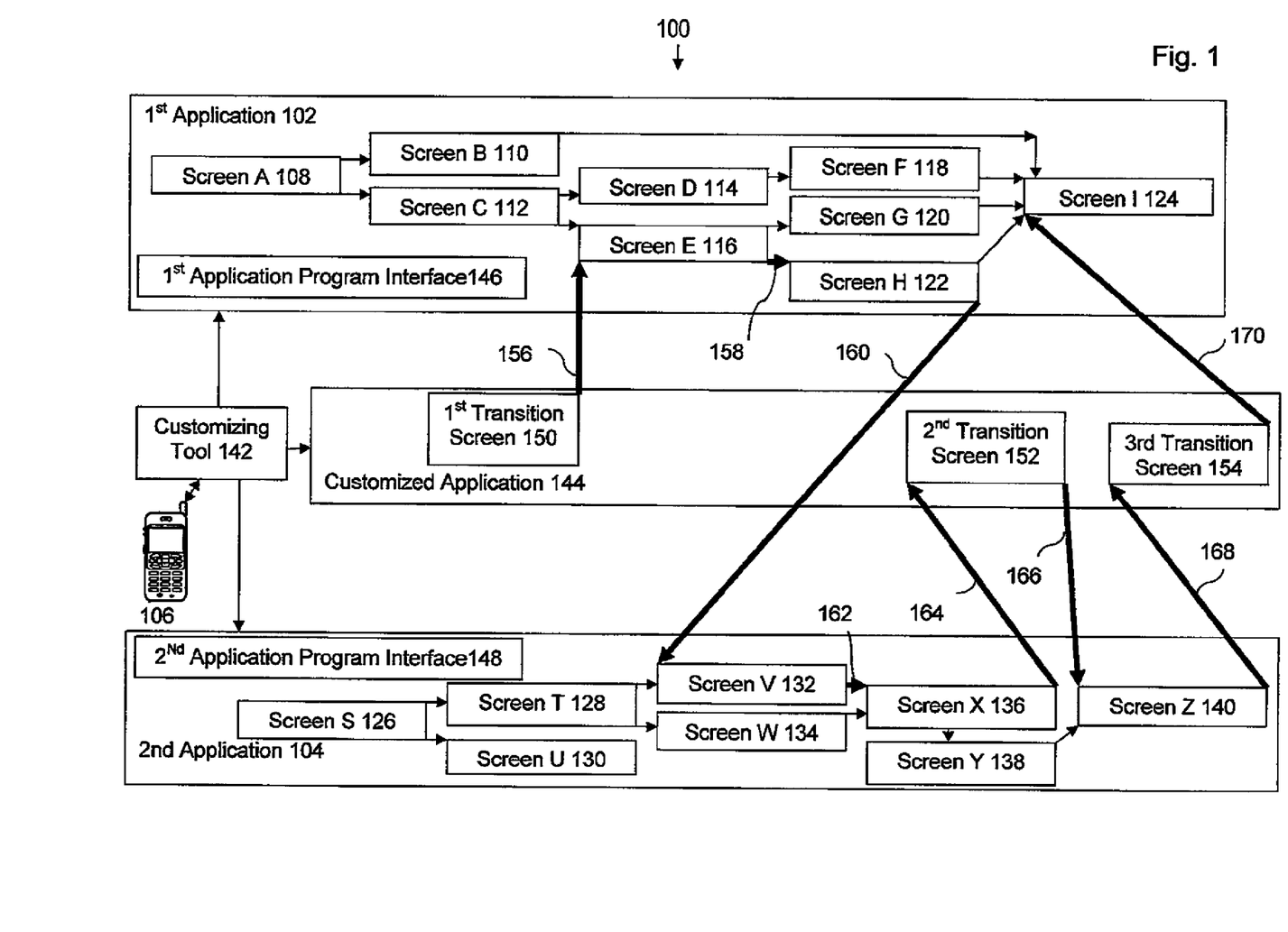
FIG. 1 shows a system for customized execution sequences for portions of third party applications according to some embodiments of the present disclosure.

FIG. 1 shows a system 100 for customized execution sequences for portions of third party applications according to some embodiments of the present disclosure. The system 100 includes a first application 102 and a second application 104, which are each third party applications that a mobile device 106 may execute. The mobile device 106 may execute the first application 102 to display screen A 108, screen B 110, screen C 112, screen D 114, screen E 116, screen F 118, screen G 120, screen H 122, and screen I 124. The mobile device 106 also may execute the second application 104 to display screen S 126, screen T 128, screen U 130, screen V 132, screen W 134, screen X 136, screen Y 138, and screen Z 140.

The system 100 also includes a customizing tool 142 that may create and promote execution of a customized application 144. The customizing tool 142 may communicate with the first application 102 via a first application program interface 146 and communicate with the second application 104 via a second application program interface 148. The customized application 144 includes a first transition screen 150, a second transition screen 152, and a third transition screen 154. Additionally the system 100 includes execution paths 156-170 created by the customizing tool 142 to direct the execution of the applications 102, 104, and 144 to display some of the screens 108-140 and 150-154.

The developer of the first application 102 may provide the first application program interface 146 that provides data associated with the screens 108-124 for the first application 102. For example, the first application program interface 146 provides data that identifies the execution entry points, the entry data, the execution exit points, and the exit data for the screens 108-124, such as the execution entry point, the entry data, the execution exit point, and the exit data for the screen E 116 that identifies movie theaters at or nearby a specified location. The execution entry point may be the first of a series of instructions that may be executed to display the screen E 116. The entry data may be the data that the instructions of the first application 102 require to properly display the screen E 116. For example, the specification of a location may be the entry data required by the screen E 116 to display a list of movie theaters at or nearby the specified location. The entry data may include required entry data and/or optional entry data. For example, the screen E 116 may display a general list of movie theaters based on a specified zip code, or the screen E 116 may display a focused list of movie theaters based on a specified street address and zip code, such that the street address is optional entry data.

The customizing tool 142 may prompt identification of entry data for each selected execution entry point. For example, the customizing tool 142 outputs information to a user interface that specifies that the entry data for the execution entry point to the screen E 116 requires a specified location, based on the data identified via the first application program interface 146. In response to this information, the developer using the customizing tool 142 may select from various options to provide the entry data for the entry execution point to ensure that the screen E 116 is displayed properly. For example, the developer may select for the mobile device 106 to activate a location application to determine the location of the mobile device 106, and use the location of the mobile device 106 as the entry data for the screen E 116. In another example, the developer may select to display the screen C 112 as part of the custom execution sequence because the screen C 112 requests a location to be entered and the screen E 116 may use the location entered via the screen C 112 as the entry data. In yet another example, the developer may create the first transition screen 150 that requests a location to be entered, and specify the execution path 156 from the execution exit point for the first transition screen 150 to the execution entry point for the screen E 116, such that the screen E 116 may use the location entered via the first transition screen 150 as entry data.

Transition screens, such as the transition screens 150-154, are screens that are not native to the underlying applications, such as the first application 102 or the second application 104. The developer may create a transition screen for many reasons, such as to fill a gap in obtaining information to feed into an application program interface, to shorten an information-obtaining process to more efficiently obtain information, and/or to transition into or between application programming interfaces. The developer may use transition screens to present fewer screens to a user or to make the screen presented more user-friendly. Depending on the underlying applications used by the developer and the customized execution sequence, the developer may employ numerous transition screens, one transition screen, or no transition screens.

The execution exit point may be the last of the series of instructions that may be executed to display the screen E 116, and the exit data may be the data that the instructions for the first application 102 provide to the next screen to be generated. For example, the screen E 116 may prompt the user of the mobile device 106 to select a movie theater from a displayed list of movie theaters. The selection of the movie theater may be the exit data for the screen E 116, and may determine whether the next screen to be displayed is the screen G 120 or the screen H 122. In FIG. 1, the execution path 158 indicates that the user's selection of a movie theater resulted in the mobile device 106 displaying the screen H 122, such that the selection of the movie theater from the list of movie theaters enables the screen H 122 to display the street address and telephone number for the selected movie theater. The customizing tool 142 may identify exit data for each selected execution exit point. For example, if the screen H 122 is selected for the customized screen execution sequence, the customizing tool 142 displays on a user interface the identification of a movie theater that is output by the screen H 122.

The customizing tool 142 may execute on the mobile device 106 to create the customized application 144 or execute on a computer to create the customized application 144 that may be downloaded to the mobile device 106. The customizing tool 142 may conduct discovery through the application program interfaces 146-148 to identify data associated with the screens 108-140. For example, the customizing tool 142 uses the application program interfaces 146-148 to identify the execution entry points, the execution exit points, the entry data, and the exit data for the screens for the first application 102, which is a navigation application, and the second application 104, which is a ticket purchase application. The customizing tool 142 enables a software developer and/or a mobile device user to select a customized screen execution sequence based on the data and a portion of the screens 108-140. For example, a mobile device user who is a software developer uses his computer to create the first half of a customized screen execution sequence based on the screens 116 and 122 from the navigation application 102 that enable identification and selection of movie theaters at or nearby a specified location. The developer may also create the second half of the customized screen execution sequence based on the screens 132, 136, and 140 from the ticket purchase application 104 that enable the selection of movies and show times for a selected theater and the purchase of movie tickets for the selected movie and show time.

The customized screen execution sequence includes at least one screen corresponding to each of the third party applications and excludes at least one default start screen associated with at least one of the third party applications. For example, execution of the customized screen execution sequence displays the screens 116 and 122 of the navigation application 102 and the screens 132, 136, and 140 of the ticket purchase application 104. However, the execution of the customized screen execution sequence bypasses displaying some of the screens of the navigation application 102 and the ticket purchase application 104, such as the default start screen S 126 for the ticket purchase application that requests a user to identify whether to purchase tickets for sporting events or for movie theaters. The execution of the customized execution sequence may also result in bypassing the display of other screens, such as the screens 108-114, 118, 126-130, 134, and 138.

The customizing tool 142 may store the selection of the customized screen execution sequence and the identification of any entry data as the customized application 144. For example, when the customizing tool 142 stores the customized application 144, the customizing tool 142 also stores the identification of the location entered via the first transition screen 150 as the exit data for the first transition screen 150 and as the entry data for the screen E 116. If the customizing tool 142 creates the customized application 144 on the mobile device 106, then the customized application 144 may be ready for execution. If the customizing tool 142 creates the customized application 144 on a computer, the computer may download the customized application 144 to the mobile device 106.

The customizing tool 142 executes the customized application 144 based on executing a customized screen execution sequence. For example, the customized tool 142 may execute the customized application 144 to display the first transition screen 150 to prompt the mobile device user to specify a location. Based on the location specified by the user, the customized application 144 may follow the execution path 156 to display the navigation application screen E 116 that enables the user to view a list of movie theaters at or nearby the specified location and to select one of the movie theaters. Based on the movie theater selected by the user, the customized application 144 may follow the execution path 158 to display the screen H 122, which displays the street address and the telephone number for the selected theater.

Instead of displaying the screen 1124, which may provide directions to the selected movie theater, the customized application 144 may respond to a selection of the option to receive the directions by following the execution path 160 to display the ticket purchase applications screen 132 for the selected theater, which enables the user to select a movie and a show time. Entry data for a selected execution entry point may be based at least in part on exit data for a selected execution exit point. For example, the entry data for the ticket purchase applications screen 132, which requires the identification of a movie theater, is based on the exit data for the screen H 122, which identifies a movie theater. Based on the selected movie and show time, the customized application 144 may follow the execution path 162 to display the ticket purchase applications screen 136, which identifies the price of the tickets for the selected movie and show time and enables the user to enter information to purchase the tickets.

Instead of requiring the user to continue to the screen Y 138 to type in the long list of numbers that comprise the user's registration identification with the ticket purchase application 104, and the user's credit card number, the customized application 144 may respond to the selection of the option to enter information by following the execution path 164 to display the second transition screen 152. The second transition screen 152 may accept the selected movie, the selected time, and the price displayed by the screen X 136 as entry data. The second transition screen 152 may display information that prompts data entry, prompts a selection, and/or provides an insight. For example, the second transition screen 152 displays the user's registration identification with the ticket purchase application 104 and the user's credit card number, and prompts the user to request the purchase of the selected movie tickets.

In response to a selection to purchase the selected movie tickets, the customized application 144 may follow the execution path 166 to bypass the screen Y 138 and display the screen Z 140 which confirms the purchase of the selected tickets. Bypassing screens may save time and increase customer satisfaction for the mobile device user.

The customizing tool 142 may execute the customized application 144 by executing a portion of the first application 102 in background while executing another portion of the second application 104, such that the customizing tool 142 executes the portion of the first application 102 upon completion of execution of the other portion of the second application 104 without reloading the first application 102. For example, in response to the confirmation of the purchase of the selected tickets, the customized application 144 may follow the execution path 168 to display the third transition screen 154, which outputs a customized result to a user interface on the mobile device 106. The customized result may confirm purchase of the tickets and offer the user the option for the customized application 144 to follow the execution path 170 to the navigation application 102 to display the screen 1124 to be provided with directions from the specified location to the movie theater. The customized result may be based on entry data for each selected execution entry point, exit data for each selected execution exit point, and data provided via the transition screens 150-154. For example, the confirmation of the purchase of the movie tickets is based on the specification of the location, the selection of the theater, the selection of the movie and show time, the confirmation of the credit card information, and the request to purchase the tickets that were provided via the navigation application screens 116 and 122, the ticket purchase application screens 132, 136, and 140, and the transition screens 150-152.

When the user selects the option to be provided with the directions to the selected movie theater, the customized application 144 may follow the execution path 170 to display the screen 1124, which displays the directions from the specified location to the selected movie theater. However, if the user postpones selection of the option to be provided with the directions to the movie theater, the customized application 144 may continue to execute the navigation application 102 in the background. In this situation, whenever the user selects the option to be provided with the directions to the selected movie theater, the customized application 144 retains the identification of the selected theater and does not have to reload the navigation application 102. Whenever the user selects to be provided with the directions to the movie theater, the third transition screen 154 enables the specification of a revised starting location, and the customized application 144 follows the execution path 170 to display the screen 1124, which displays the directions from the previously specified location or the revised starting location to the movie theater. For example, the user of the mobile device 106 may purchase the movie tickets while the user is at work, and postpone requesting directions to the movie theater until the user is eating at a restaurant prior to the beginning of the selected movie show time.

Enabling the creation of customized execution sequences for portions of the applications 102-104 may result in increased usage of the portions of the applications 102-104, which may result in increased advertising revenue for and/or increased customer satisfaction with the applications 102-104. Creation of the customized application 144 also may result in increased mobile device usage, which may result in increased revenue for the mobile device communication service provider and in increased customer satisfaction with the mobile device manufacturer and the mobile device communication service provider.

The customized application 144 may be conveyed from the mobile device 106 to another mobile device 106. For example, because a user of the mobile device 106, who may or may not be a professional software developer, is highly satisfied with the capabilities of the customized application 144, which the user may have created and/or downloaded via the customizing tool 142, the user forwards the customized application 144 to a friend's mobile device 106. Sharing the customized application 144 with a friend may result in increasing the friend's customer satisfaction with the mobile device manufacturer and the mobile device communication service provider. Furthermore, the user of the mobile device 106 may encourage another friend to purchase the same model of the mobile device 106 and to subscribe to the same mobile device communication service provider so that the user can share customized applications with the friend, which may result in increasing the sales of the mobile device 106 and subscriptions to the mobile device communication service provider. Although the pending disclosure describes the customizing tool using one navigation application 102 and one ticket purchase application 104 to create the customized application 144, the customizing tool may use any number and any type of the applications 102-104 to create the customized application 144.

Figure 2:
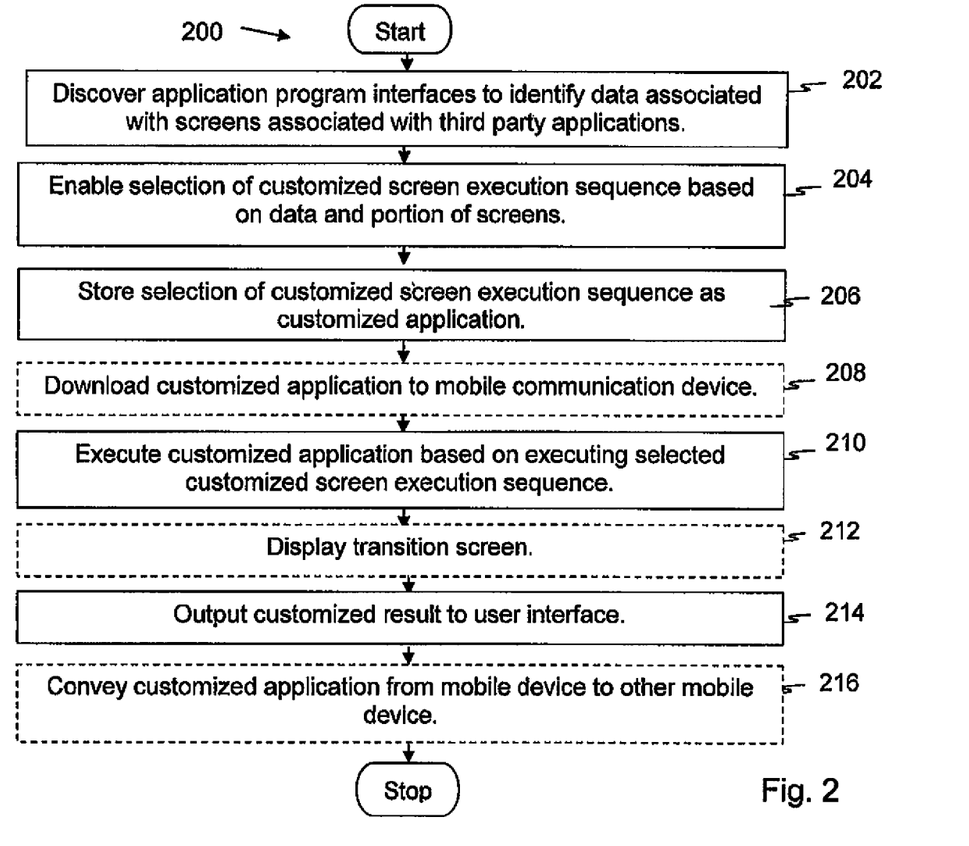
FIG. 2 is a flowchart of a method for customized execution sequences for portions of third party applications according to some embodiments of the present disclosure.

FIG. 2 shows a flowchart of a method 200 for customized execution sequences for portions of third party applications according to some embodiments of the present disclosure. The system 100 may execute the method 200 to enable a mobile device user to execute customized execution sequences for portions of third party applications 102-104.

In box 202, application program interfaces are discovered to identify data associated with screens that are associated with third party applications. For example, the customizing tool 142 discovers the application program interfaces 146-148 to identify data associated with screens 108-140 associated with the navigation application 102 and the ticket purchase application 104.

In box 204, selection of a customized screen execution sequence is enabled based on the data and a portion of the screens. For example, the customizing tool 142 enables a selection of a customized screen execution sequence based on the data and a portion of the screens 108-140 for the navigation application 102 and the ticket purchase application 104.

In box 206, a selection of a customized screen execution sequence is stored as a customized application. For example, the customizing tool 142 stores the selection of the customized screen execution sequence that follows the execution paths 156-170 as the customized application 144 for purchasing movie tickets and receiving directions to a movie theater.

In box 208, a customized application is optionally downloaded to a mobile device. For example, the customizing tool 142 downloads the customized application 144 that includes the execution paths 156-170 from a computer to the mobile device 106.

In box 210, a customized application is executed based on executing a selected customized screen execution sequence. For example, the mobile device 106 executes the customized application 144 for purchasing movie tickets and receiving directions to a movie theater based on executing selected a customized screen execution sequence that follows the execution paths 156-170.

In box 212, a transition screen is optionally displayed. For example, the mobile device 106 displays the second transition screen 152 by following the execution path 164.

In box 214, a customized result is output to a user interface. For example, the mobile device 106 outputs a customized result to a user interface that enables a user of the mobile device 106 to confirm the purchase of movie tickets and to receive directions to the movie theater.

In box 216, a customized application is optionally conveyed from a mobile device to another mobile device. For example, the user of mobile device 106 conveys the customized application 144 from the mobile device 106 to a friend's mobile device 106.

Figure 3:
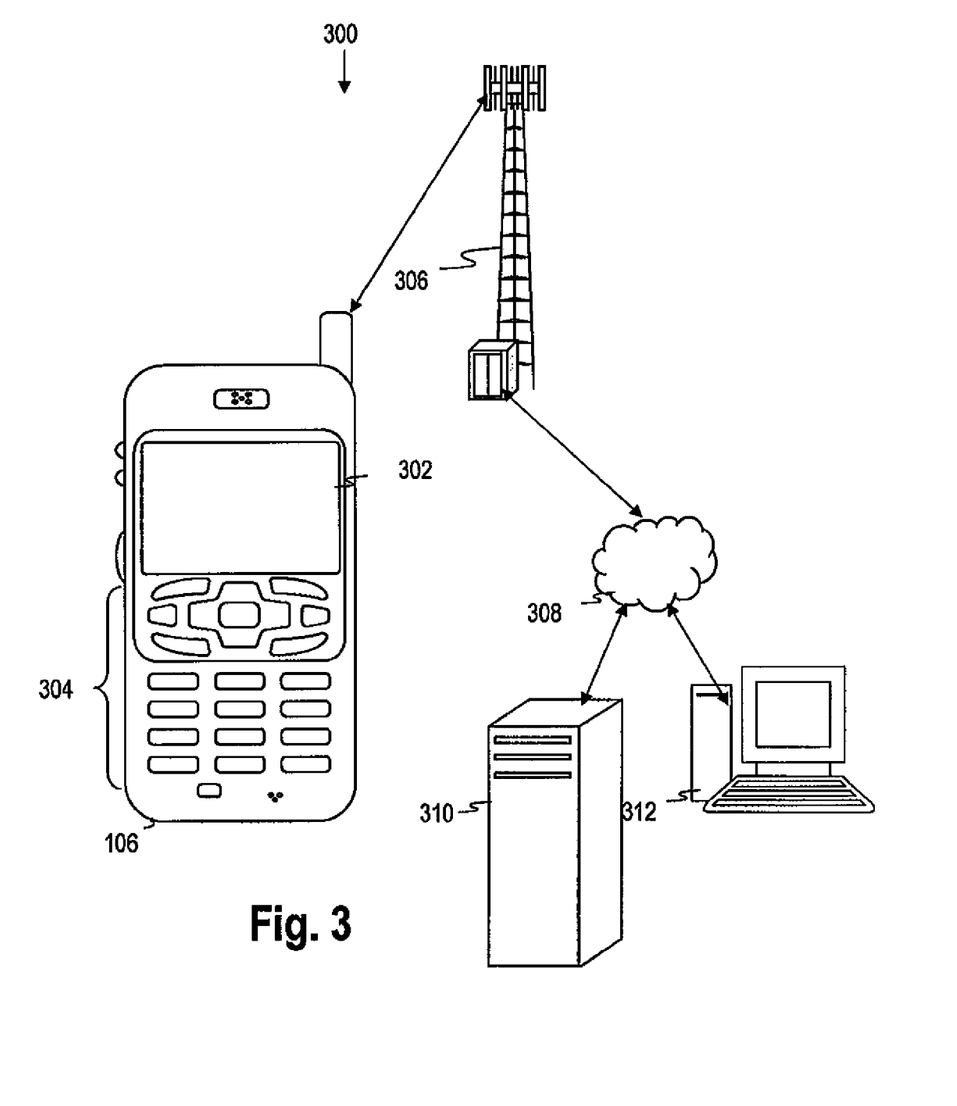
FIG. 3 shows another system for customized execution sequences for portions of third party applications according to some embodiments of the present disclosure.

FIG. 3 shows a wireless communications system 300 including a mobile device 106. FIG. 3 depicts the mobile device 106, which is operable for implementing aspects of the present disclosure, but the present disclosure should not be limited to these implementations. Though illustrated as a mobile phone, the mobile device 106 may take various forms including a wireless handset, a pager, a personal digital assistant (PDA), a mobile telecommunication device, a mobile handset, a wireless mobile device, a gaming device, an inventory control device, a media player, a digital camera, a digital calculator, a digital music player, a personal computer, a mobile computer, a portable computer, a tablet computer, a laptop computer, and/or other. Many suitable mobile devices 106 combine some or all of these functions. In some embodiments of the present disclosure, the mobile device 106 is not a general purpose computing device like a portable, laptop or tablet computer, but rather is a special-purpose communications device such as a mobile phone, wireless handset, pager, or PDA. The mobile device 106 may support specialized activities such as gaming, inventory control, job control, and/or task management functions, and so on.

The mobile device 106 includes a display 302 and a touch-sensitive surface or keys 304 for input by a user. The mobile device 106 may present options for the user to select, controls for the user to actuate, and/or cursors or other indicators for the user to direct. The mobile device 106 may further accept data entry from the user, including numbers to dial or various parameter values for configuring the operation of the mobile device 106. The mobile device 106 may further execute one or more software or firmware applications in response to user commands. These applications may configure the mobile device 106 to perform various customized functions in response to user interaction. Additionally, the mobile device 106 may be programmed and/or configured over-the-air, for example from a wireless base station, a wireless access point, or a peer mobile device 106.

The mobile device 106 may execute a web browser application which enables the display 302 to show a web page. The web page may be obtained via wireless communications with a base transceiver station (BTS) 306, a wireless network access node, a peer mobile device 106 or any other wireless communication network or system. While a single BTS 306 is illustrated, it is understood that the wireless communication system may comprise additional BTS's 306. In some instances, the mobile device 106 may be in communication with multiple BTS's 306 at the same time. The BTS 306 (or wireless network access node) is coupled to a network 308 such as the Internet. Via the wireless link and the wired network, the mobile device 106 has access to information on various servers, such as a server 310 and a user interface 312. The server 310 may provide content that may be shown on the display 302. Alternately, the mobile device 106 may access the BTS 306 through a peer mobile device 106 acting as an intermediary, in a relay type or hop type of connection.

Figure 4:
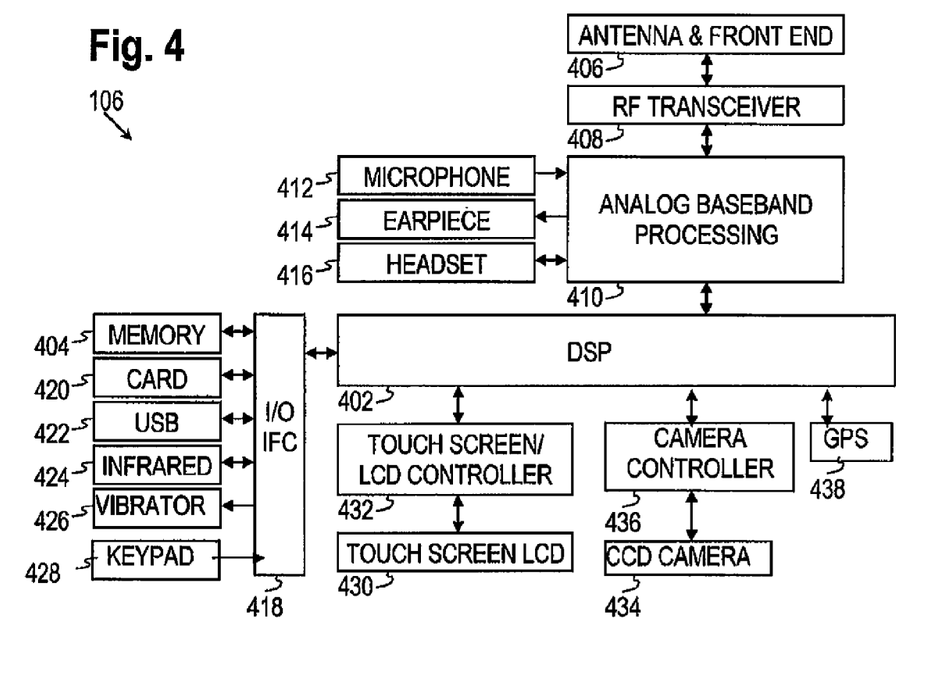
FIG. 4 shows a block diagram of an illustrative mobile device.

FIG. 4 shows a block diagram of the mobile device 106. While a variety of known components of mobile devices 106 are depicted, in an embodiment a subset of the listed components and/or additional components not listed may be included in the mobile device 106. The mobile device 106 includes a digital signal processor (DSP) 402 and a memory 404. As shown, the mobile device 106 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 106 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 106 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 106 to send and receive information from a radio access network (RAN) or some other available wireless communications network or from a peer mobile device 106. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RE power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece speaker 414 and the headset port 416. To that end, the analog baseband processing unit 410 may have ports for connecting to the built-in microphone 412 and the earpiece speaker 414 that enable the mobile device 106 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 106 to function as a peripheral device to exchange information with a personal computer or other computer system. The infrared port 424 and other optional ports such as a Bluetooth interface or an IEEE 802.11 compliant wireless interface may enable the mobile device 106 to communicate wirelessly with other nearby mobile devices 102 and/or wireless base stations.

The input/output interface 418 may further connect the DSP 402 to the vibrator 426 that, when triggered, causes the mobile device 106 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 106. Another input mechanism may be the touch screen LCD 430, which may also display text and/or graphics to the user. The touch screen LCD controller 432 couples the DSP 402 to the touch screen LCD 430.

The CCD camera 434 enables the mobile device 106 to take digital pictures. The DSP 402 communicates with the CCD camera 434 via the camera controller 436. The GPS sensor 438 is coupled to the DSP 402 to decode global positioning system signals, thereby enabling the mobile device 106 to determine its position. In another embodiment, a camera operating according to a technology other than charge coupled device cameras may be employed. Various other peripherals may also be included to provide additional functions, e.g., radio and television reception.

Figure 5:
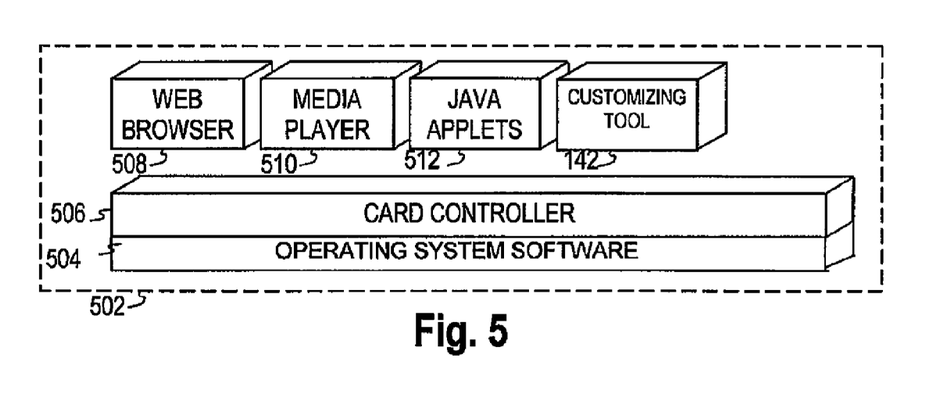
FIG. 5 shows a block diagram of an illustrative software configuration for a mobile device.

FIG. 5 illustrates a software environment 502 that may be implemented by the DSP 402. The DSP 402 executes operating system drivers 504 that provide a platform from which the rest of the software operates. The operating system drivers 504 provide drivers for the mobile device hardware with standardized interfaces that are accessible to application software. The operating system drivers 504 include application management services ("AMS") 506 that transfer control between applications running on the mobile device 106. Also shown in FIG. 5 are a web browser application 508, a media player application 510, JAVA applets 512, and the customizing tool 142. The web browser application 508 configures the mobile device 106 to operate as a web browser, allowing a user to enter information into forms and select links to retrieve and view web pages. The media player application 510 configures the mobile device 106 to retrieve and play audio or audiovisual media. The JAVA applets 512 configure the mobile device 106 to provide games, utilities, and other functionality. The customizing tool 142 enables the creation of customized applications based on customized execution sequences for portions of third party applications.

Figure 6:
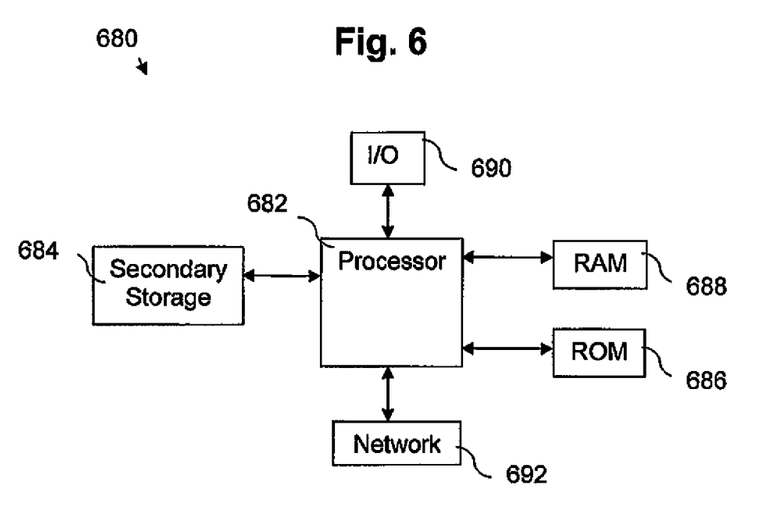
FIG. 6 illustrates an exemplary computer system suitable for implementing some aspects of the several embodiments of the disclosure.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for customized execution sequences for portions of third-party mobile device applications, comprising:
    a processor; and
    a customizing tool that, when executed by the processor,
        discovers a first application program interface associated with a first third-party mobile device application,
        queries the first application program interface for data associated with a first plurality of screens that are associated with the first third-party mobile device application,
        receives from the first application program interface the data associated with the first plurality of screens,
        discovers a second application program interface associated with a second third-party mobile device application,
        queries the second application program interface for data associated with a second plurality of screens that are associated with the second mobile device third-party application,
        receives from the second application program interface the data associated with the second plurality of screens, wherein the data associated with the first plurality of screens and second plurality of screens comprises execution entry points, entry data, execution exit points, and exit data,
        enables selection of a customized screen execution sequence based on the received data associated with the first plurality of screens and the received data associated with the second plurality of screens, wherein the customized screen execution sequence comprises at least one of the first plurality of screens and at least one of the second plurality of screens, and wherein the customized screen execution sequence excludes at least one screen from at least one of the first plurality of screens and the second plurality of screens, and
        stores the selection of the customized screen execution sequence as a customized application, wherein execution of the customized application outputs a customized result to a user interface, wherein the customized result is based on execution of the customized screen execution sequence, wherein exit data for a first screen in the first plurality of screens determines a next screen to be displayed in the customized screen execution sequence, wherein the customized screen execution sequence further includes at least one transition screen that is not native to any of the third-party mobile device applications, and wherein exit data for one of the at least one transition screens determines a next screen to be displayed in the customized screen execution sequence.

2. The system of claim 1, wherein the entry data comprises entry data associated with each of the plurality of execution entry points.

3. The system of claim 1, wherein the entry data comprises at least one of required entry data and optional entry data.

4. The system of claim 1, wherein the exit data comprises exit data associated with each of the plurality of execution exit points.

5. The system of claim 1, wherein the customizing tool queries and receives identification of entry data for each selected execution entry point.

6. The system of claim 1, wherein the customizing tool identifies exit data for each selected execution exit point.

7. The system of claim 1, wherein the customizing tool stores the selection of the customized screen execution sequence and the identification of entry data.

8. The system of claim 1, wherein the customized result is based on entry data for each selected execution entry point and exit data for each selected execution exit point.

9. The system of claim 1, wherein entry data for a selected execution entry point is based at least in part on data provided via a transition screen created by the customizing tool.

10. The system of claim 1, wherein entry data for a selected execution entry point is based at least in part on exit data for a selected execution exit point.

11. The system of claim 1, wherein the customized result is based on data provided via a transition screen created by the customizing tool.

12. The system of claim 1, wherein the customized result is based on exit data for a selected execution exit point.

13. A computer implemented method for customized execution sequences for portions of third-party mobile device applications, comprising:
    discovering a first application program interface associated with a first third-party mobile device application;
    querying the first application program interface for data associated with a first plurality of screens that are associated with the first third-party mobile device application;
    receiving from the first application program interface the data associated with the first plurality of screens;
    discovering a second application program interface associated with a second third-party mobile device application;

querying the second application program interface for data associated with a second plurality of screens that are associated with the second third-party mobile device application;

receiving from the second application program interface the data associated with the second plurality of screens, wherein the data associated with the first plurality of screens and second plurality of screens comprises execution entry points, entry data, execution exit points, and exit data;

enabling selection of a customized screen execution sequence based on the received data associated with the first plurality of screens and the received data associated with the second plurality of screens, wherein the customized screen execution sequence comprises at least one of the first plurality of screens and at least one of the second plurality of screens, and further wherein the customized screen execution sequence excludes at least one screen from at least one of the first plurality of screens and the second plurality of screens; and storing the selection of the customized screen execution sequence as a customized application, wherein execution of the customized application outputs a customized result to a user interface, wherein the customized result is based on execution of the customized screen execution sequence, wherein exit data for a first screen in the first plurality of screens determines a next screen to be displayed in the customized screen execution sequence, wherein the customized screen execution sequence further includes at least one transition screen that is not native to any of the third-party mobile device applications, and wherein exit data for one of the at least one transition screens determines a next screen to be displayed in the customized screen execution sequence.

14. The computer implemented method of claim 13, wherein the transition screen displays information that one of prompts data entry, prompts a selection, and provides an insight.

15. The computer implemented method of claim 13, further comprising downloading the customized application to a mobile device.

16. The computer implemented method of claim 15, further comprising conveying the customized application from the mobile device to another mobile device.

17. A system for customized execution sequences for portions of third-party mobile device applications, comprising:
a processor; and
a customizing tool that, when executed by the processor, executes a customized mobile device application based on executing a selected customized screen execution sequence,
wherein the selected customized screen execution sequence is based on data discovered via a plurality of application program interfaces,
wherein each of the plurality of application program interfaces is associated with a corresponding one of a plurality of third-party mobile device applications,
wherein a first application program interface is associated with a first plurality of screens and a second application program interface is associated with a second plurality of screens,
wherein the customized screen execution sequence includes at least one of the first plurality of screens and at least one of the second plurality of screens, and wherein the customized screen execution sequence excludes at least one screen from at least one of the first plurality of screens and the second plurality of screens,
wherein exit data for a first screen in the first plurality of screens determines a next screen to be displayed in the customized screen execution sequence,
wherein the customized screen execution sequence further includes at least one transition screen that is not native to any of the third-party mobile device applications, and
wherein exit data for one of the at least one transition screens determines a next screen to be displayed in the customized screen execution sequence; and
outputs a customized result to a user interface, wherein the customized result is based on execution of the customized screen execution sequence.

18. The system of claim 17, wherein the customizing tool executes the customized mobile device application by executing a portion of the first third-party mobile device application in background while executing a portion of the second third-party mobile device application, such that the customizing tool executes the portion of the first third-party mobile device application upon completion of execution of the portion of the second third-party mobile device application without reloading the first third-party mobile device application.

* * * * *